United States Patent [19]

Black

[11] 4,321,005
[45] Mar. 23, 1982

[54] MODULAR WINDMILL INSTALLATION

[76] Inventor: Jerimiah B. Black, 2065 Church Creek Dr., Charleston, S.C. 29407

[21] Appl. No.: 109,258

[22] Filed: Jan. 3, 1980

[51] Int. Cl.³ .............................................. F03D 7/06
[52] U.S. Cl. ...................................... 415/4; 416/32; 416/197 A
[58] Field of Search ...................................... 415/2-4; 416/197 A, 32, 169 B, 121 A

[56] References Cited

U.S. PATENT DOCUMENTS

| | | | |
|---|---|---|---|
| 692,714 | 2/1902 | Sala et al. | 416/197 A |
| 930,794 | 8/1909 | Pierson | 416/32 |
| 1,027,501 | 5/1912 | Pearson | 416/DIG. 4 X |
| 1,411,137 | 3/1922 | Toborg | 416/32 |
| 1,441,774 | 1/1923 | Adams | 415/4 X |
| 1,804,493 | 5/1931 | Benjamins | 416/32 |
| 1,974,008 | 9/1934 | Biehn | 415/2 R |
| 2,094,603 | 10/1937 | Keene | 416/119 X |
| 2,224,851 | 12/1940 | Lea | 416/DIG. 6 |
| 2,431,111 | 11/1947 | DuBrie | 415/2 R |
| 3,902,072 | 8/1975 | Quinn | 416/119 X |
| 3,938,907 | 2/1976 | Magoveny et al. | 415/2 R X |
| 4,113,408 | 9/1978 | Wurtz et al. | 416/117 X |
| 4,134,707 | 1/1979 | Ewers | 415/4 |
| 4,134,708 | 1/1979 | Brauser et al. | 416/119 X |
| 4,161,658 | 7/1979 | Patrick | 416/48 X |
| 4,165,468 | 8/1979 | Fry et al. | 416/121 A X |
| 4,204,126 | 5/1980 | Diggs | 415/4 R |
| 4,213,734 | 7/1980 | Lagg | 415/4 A |
| 4,237,384 | 12/1980 | Kennon | 415/4 R X |
| 4,245,958 | 1/1981 | Ewers | 416/197 A |

*Primary Examiner*—Everette A. Powell, Jr.
*Attorney, Agent, or Firm*—Wigman & Cohen

[57] ABSTRACT

A windmill installation adapted to extract energy from natural wind currents is disclosed wherein a plurality of individual wind wheel modules are stacked vertically in a tower-like structure and are interconnected with one another to operate in a unitary manner. Each module has a rotor assembly which is disengageable from the rotor assemblies of other modules without interrupting the generation of power from the installation. A rotatable windshield is provided about the rotor assembly for improving output efficiency of the wind wheel and protecting the rotor assembly from damage in the event of excessively high wind speeds. The angular position of the windshield is determined by an automatic control system responsive to wind speed and direction.

14 Claims, 10 Drawing Figures

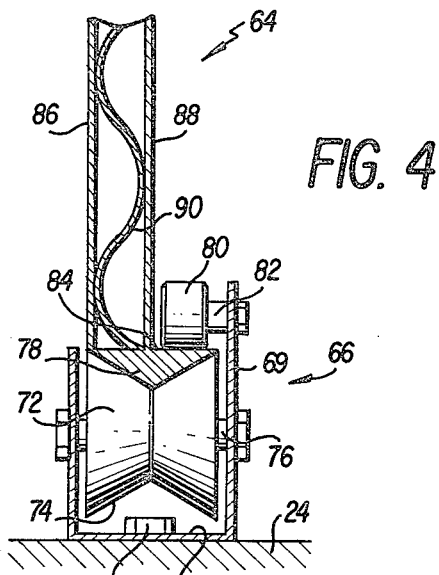
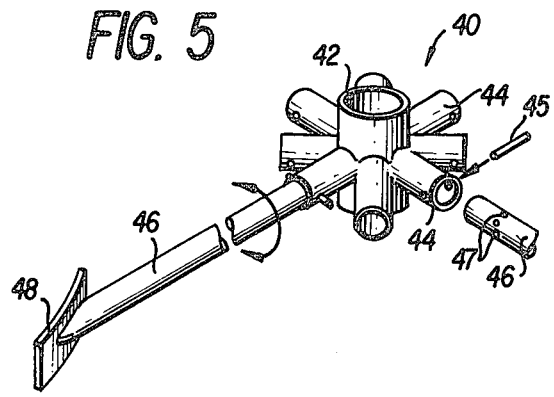
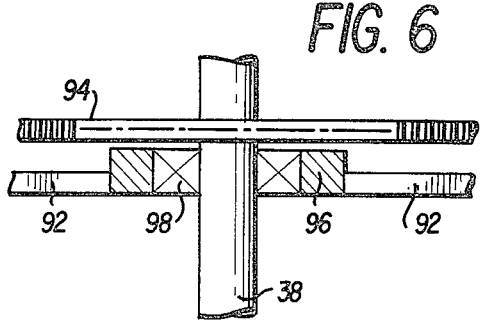
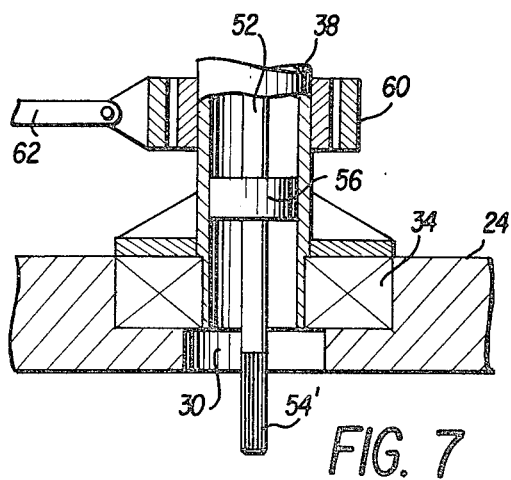
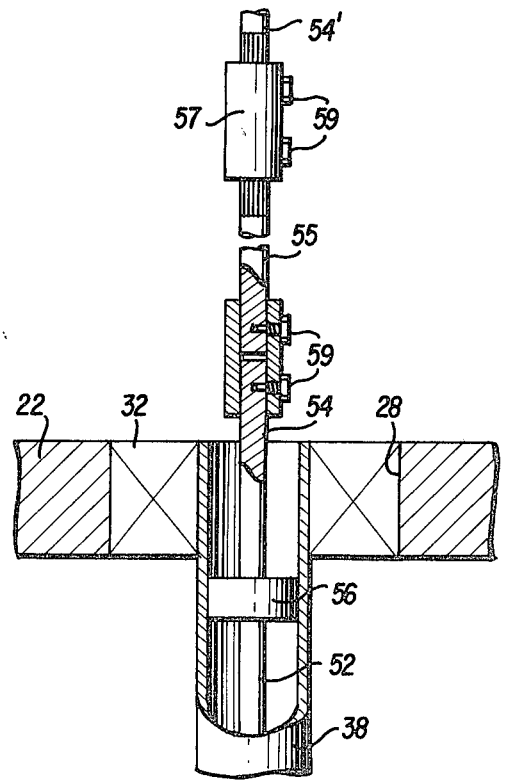

MODULAR WINDMILL INSTALLATION

BACKGROUND OF THE INVENTION

The present invention relates to new and useful improvements in windmills for harnessing wind energy and, more particularly, to a modular windmill installation for transforming the energy of wind currents into a usable rotational force and for storing any excess energy generated by the windmill installation.

Windmills and other wind-driven power generating apparatus have long been known in the art. Such apparatus is exemplified by the windmills and wind motors disclosed, for example, in U.S. Pat. Nos. 1,234,405; 2,431,111; and 4,134,707. One type of windmill apparatus is conventionally constructed with a plurality of vertically stacked, individual segments of two or more wind wheels or wind rotors, each of which is adapted to be drivingly connected to a common output drive shaft. By increasing the number of individual segments connected to the drive shaft, the greater the driving force or torque and, thereby, the greater the power that can be generated with the apparatus.

The wind motor apparatus of U.S. Pat. No. 2,431,111 includes a manually-operated, jaw-type positive clutch for selectively connecting and disconnecting wind wheel segments in series depending on the magnitude of the wind force or the output power desired. In this way, the apparatus is said to be adapted for operation in low or high wind currents or for operating, for example, more than one power consuming mechanism.

U.S. Pat. Nos. 1,234,405 and 4,134,707 both disclose wind turbine apparatus which comprise discrete wind wheel segments joined together in a vertical stack to form a unitary wind turbine. As the segments are added, they are rigidly interconnected to either the drive shaft or to each other from the lowermost to the topmost segment.

One disadvantage of the windmills and wind turbine apparatus of the type according to the aforementioned prior art patents is that no provision is made for the continued generation of power by the apparatus in the event of random failure of one or more of the individual wind wheel segments.

It is also known to employ a windshield or casing for covering a portion of the blades of a wind wheel rotor so that the wind stream impinges on only those blades which are properly oriented with respect to the wind direction. U.S. Pat. Nos. 1,460,114 and 2,059,356, for example, disclose wind wheels having shields mounted for rotation about the periphery of a wind rotor. Wind vanes connected to the shields are said to cause the shields to respond to wind direction in a manner to present the most favorable rotor aspect to the wind stream, as well as to shield the blades from the force of the wind when the velocity thereof becomes sufficiently high to cause damage to the wind wheel installation.

SUMMARY AND OBJECTS OF THE INVENTION

The present invention seeks to overcome the aforementioned disadvantage of the prior art windmill devices, as well as other limitations and shortcomings not specifically mentioned above, by providing a novel windmill installation for extracting power from natural wind currents which is advantageously constructed of a plurality of individual modules arranged in vertically stacked relation to form a tower platform and wherein any selected module of the installation may be individually shut down or disconnected for routine maintenance or repair of malfunction or damage without the necessity for interrupting the power generation of the entire installation.

It is, therefore, a primary objective of this invention to provide a modular windmill installation capable of substantially uninterrupted power generation over long periods of time by means of a novel arrangement for interconnecting the output shafts of the wind wheel modules in a manner to make it possible to stop the rotation of the wind wheel rotor of any selected module without requiring stoppage of rotation of the rotor of any other module.

More particularly, it is an object of the present invention to provide a modular windmill installation in which a plurality of wind wheel rotors, each having a hollow shaft, are stacked in vertical end-to-end relation and are drivingly connected to a power output shaft arranged coaxially within the hollow rotor shafts by means of a clutch of the type which automatically engages in one direction of rotation and free-wheels in the other rotational direction.

Another object of this invention is to provide a windmill installation comprising a plurality of vertically stacked wind wheel modules, each module having a rotatable windshield disposed at least partly thereabout. A control system is provided for controlling the angular position of all the shields or, alternately, independently of the shields of other modules to orient the shield with respect to the wind so as to achieve maximum output from a respective wind wheel rotor and to completely shield the rotor from the wind when the velocity thereof exceeds a predetermined maximum.

A further object of the present invention is to provide a windmill installation which includes means for generating electrical energy and means for storing excess kinetic energy generated by the windmill, mechanically.

Yet another object of this invention is to provide a modular windmill installation which is designed for economical construction by mass production methods and which is characterized by a remarkable simplicity and economy of design.

Another object of this invention is to provide a novel wind wheel rotor and rotor blade for use in a module for a windmill installation.

Still another object of this invention is to provide a windmill tower platform which is advantageously suitable for alternate uses, such as an air traffic control tower, coastal lighthouse, water tower, fire lookout tower or the like.

Briefly described, the aforementioned objects are accomplished according to the present invention by providing a windmill installation comprising a plurality of wind wheel modules stacked one upon another in the form of a vertical, tower-type structure, the output power required of the installation determining the total number of modules to be used. The modules of the tower are advantageously of sturdy, rugged construction, such as structural steel and/or reinforced concrete so that the top of the tower structure may be utilized to support substantial weight, such as, for example, power generating or power storage equipment or a facility which is not necessarily related to the power generating function of the installation, such as an air control tower or the like. Preferably, the modules are stacked upon a base comprising a reinforced concrete shell or building which is partly embedded in the ground and which houses power generating and/or power storage equipment.

Each module includes a structure or frame comprising upper and lower reinforced concrete decks or fabricated structural steel interconnected in spaced relation by a plurality of support columns. Centrally of each deck fabrication an opening is provided in which bearings are mounted for rotatably supporting a wind wheel rotor of novel construction. The wind wheel rotor shaft is formed of a hollow tube and a second shaft comprising a power output or central drive shaft extends coaxially through the hollow rotor shaft and is coupled thereto by means of clutches which positively couple the rotor shaft to the drive shaft in one rotational direction and permit free wheeling or decoupling of the rotor shaft from the drive shaft in the other rotational direction. Thus, during operation of the windmill installation, the wind wheel rotor of any particular module in the tower structure may be stopped from rotation, i.e., decoupled from the central drive shaft, without requiring shut-down of the entire installation. For this purpose, the hollow rotor shaft of each module is provided with braking means for stopping the rotation thereof when it is desired to perform maintenance or repair on the equipment in that particular module.

Each module is also preferably provided with an automatically positionable windshield which is movable about a circular roller track mounted on the lower deck of the module at a slightly greater diameter than the maximum rotor diameter. The windshield is formed of a cylindrically curved shell of somewhat greater than 180° of circumferential surface. The primary purpose of this windshield, as will be appreciated by those skilled in the art, is to provide an imbalance of wind forces on the rotor blades on opposite sides of the rotor shaft so as to produce a rotational output of the rotor. While a windshield is preferred and desirable, it is also within the contemplation of the present invention that, under certain circumstances, the windshield could be eliminated entirely because of the novel construction of the wind wheel rotor blades which results in an imbalance of wind forces.

According to a preferred construction, the windshield is positively driven to its proper angular position on the circular roller track by means of a drive train including a gear arrangement or the equivalent, a drive motor and a servo control system. The proper angular position of the windshield is determined in response to sensed wind direction and wind speed which are inputs to the control system, the output of which operates the drive motor to rotate the windshield until the correct position is obtained.

With these and other objects, advantages and features of the invention that may become hereinafter apparent, the nature of the invention may be more clearly understood by reference to the following detailed description of the invention, the appended claims and to the several views illustrated in the attached drawings wherein:

BRIEF DESCRIPTION OF THE DRAWINGS

FIG. 4 is a fragmentary cross-sectional view showing a detail of the windshield and circular roller track according to the present invention;

FIG. 5 is a fragmentary perspective view illustrating details of the wind wheel rotor of the invention;

FIGS. 6-9 are fragmentary and cross-sectional views showing various constructional details of the wind wheel module, rotor and windshield according to the present invention.

DETAILED DESCRIPTION OF A PREFERRED EMBODIMENT

Figure 1:
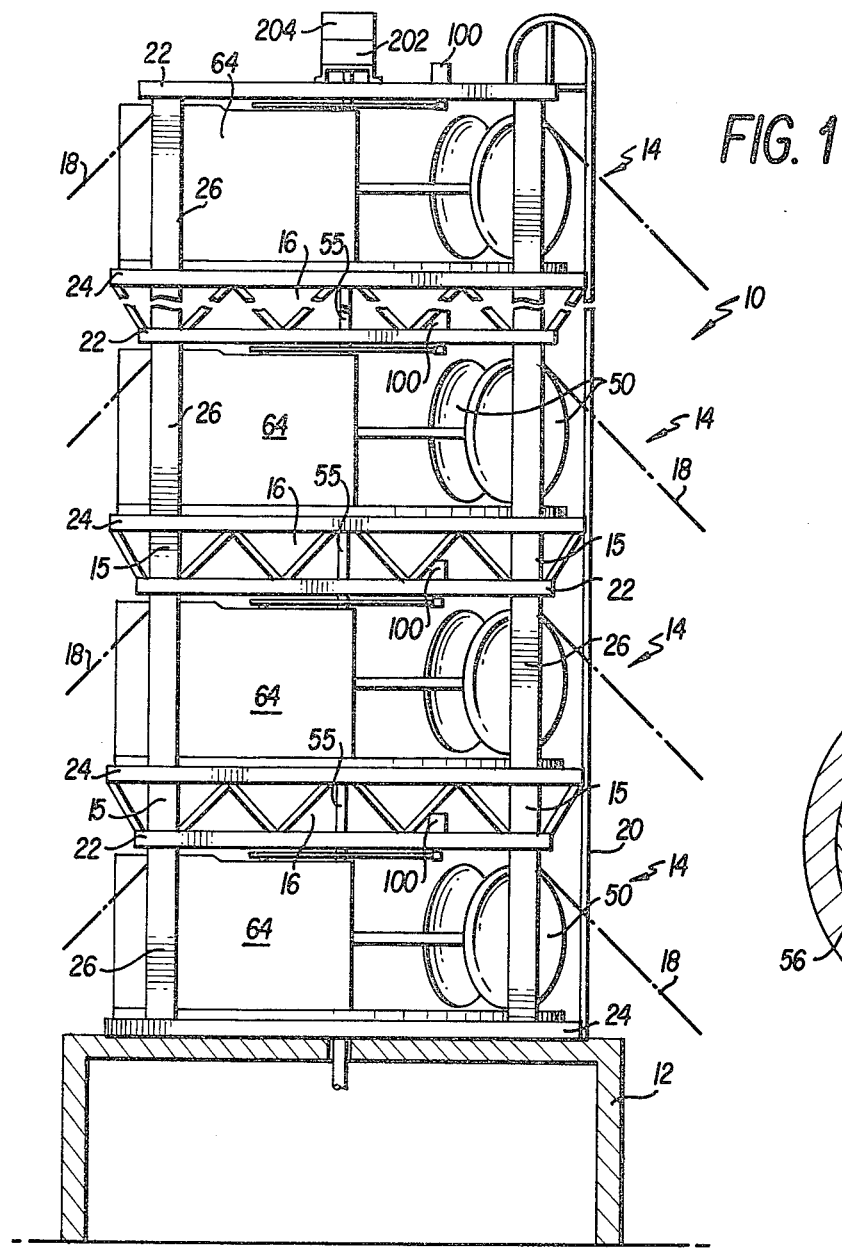
FIG. 1 is a broken side elevational view of a windmill tower installation comprising a plurality of wind wheel modules according to the present invention.

Referring now in detail to the drawings wherein like parts are designated by like reference numerals throughout, there is illustrated in FIG. 1 a windmill installation according to the present invention which is designated generally by reference numeral 10. The installation 10 comprises a support base or power house building 12 constructed of structural steel and reinforced concrete for housing power take-off and storage equipment (not shown). Such equipment preferably includes power take-off and power storage arrangements similar to those disclosed in my prior U.S. Pat. Nos. 3,945,453 and 4,038,821, the disclosures of which are hereby incorporated by reference.

Mounted in vertically stacked, spaced relation upon the support base 12 are four substantially identically constructed wind wheel modules 14 separated from one another by spacer posts 15 defining crawl spaces 16. Four modules are depicted merely for purposes of illustration, it being understood that a lesser or, in most cases, a greater number of modules 14 may be employed in order to obtain a power output commensurate both with the energy need and the overall structural integrity of the unitary tower-like installation 10.

If found necessary, the stability of the installation 10 may be improved by the use of guy wires or cables 18 extending from the modules 14 to appropriate anchoring means (not shown) in the ground. A service ladder 20 is mounted on one side of the installation for providing access to the individual modules 14, the crawl spaces 16 therebetween and to the topmost surface of the installation, especially in the event the installation is utilized for housing some other type of facility, such as an air control tower, coastal lighthouse or the like. Should the installation 10 be of substantial height, i.e., several hundred feet, it is also possible, for safety purposes, to provide a conventional enclosed elevator extending along one side of the tower installation.

Figure 2:
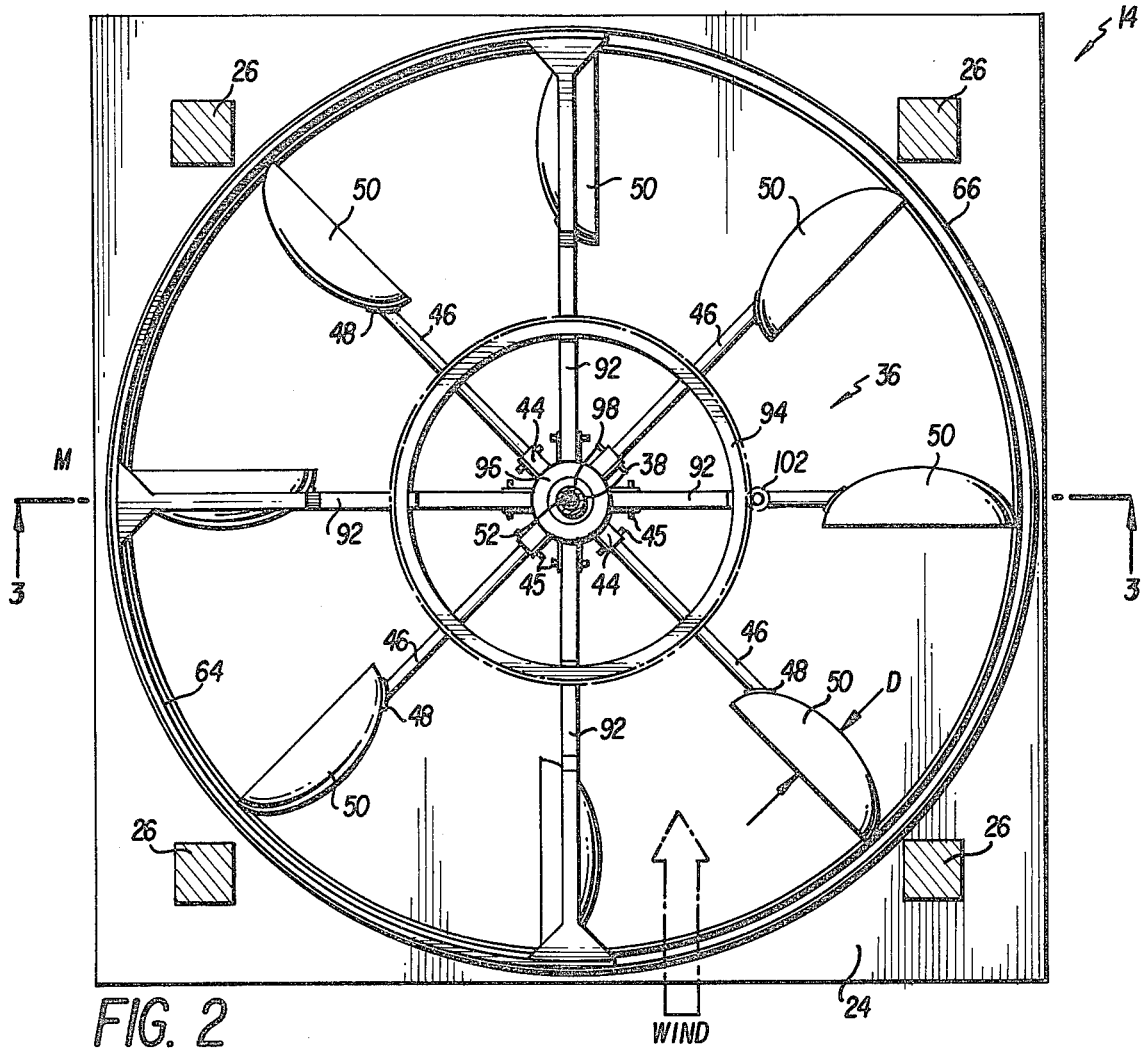
FIG. 2 is a top plan view, partly in cross-section, of a wind wheel module constructed according to the present invention.
Figure 3:
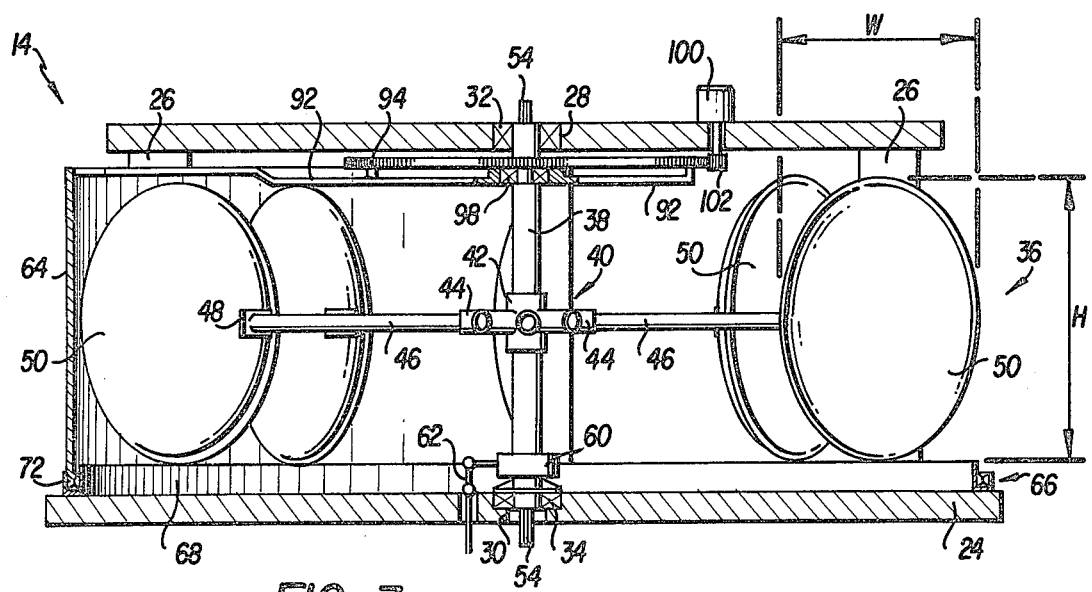
FIG. 3 is a cross-sectional view taken along the plane of line 3—3 of the wind wheel module of FIG. 2.

Referring now to FIGS. 2 and 3 which illustrate a single wind wheel module, it will be seen that the module 14 comprises upper and lower planar decks 22, 24, respectively, of reinforced concrete construction, which are preferably formed integrally with four reinforced concrete columns or structural steel posts 26 arranged between the four corners of the decks. The decks 22, 24 and columns 26 are shown formed with polygonal shapes, i.e., square or rectangular, but may also be fabricated with circular profiles or cross-sections if desired.

The upper and lower decks 22, 24 are provided with central bores 28, 30 for mounting upper and lower bearings 32, 34, respectively, which bearings rotatably support the wind wheel rotor assembly 36. The details of these bearing arrangements in the upper and lower decks are shown and described hereinafter in connection with FIGS. 7 and 8.

A rotor assembly 36 comprises a hollow tubular shaft 38 rotatably mounted at its upper end in bearing 32 and at its lower end in thrust bearing 34. At approximately the middle of the shaft 38, a cylindrical hub 40 is rigidly secured by welding, bolts or other suitable fastening means. Hub 40 comprises a tubular sleeve 42 having welded thereto a plurality of tubular, spoke-like projections 44 extending radially outwardly therefrom in equiangular spaced relation. In the embodiment shown in the drawings, eight projections 44 are provided, although a greater or lesser number may be utilized. Rotor arms 46 are slidingly and releasably received in the tubular projections 44 by means of fasteners 45, which may be a pin, bolt, cotter key or the like. Each arm 46 has a curved plate 48 welded at the outermost radial end thereof. The curved plates 48 comprise mounting brackets for the rotor blades 50 of the wind wheel rotor assembly 36. As best seen in FIG. 5, the inner radial ends of the arms 46 are provided with a number of angularly spaced bores 47 so that, if desired, the arms 46 may be fixed to the projections 44 with the blades 50 arranged at an angle to the vertical.

The blades 50 are advantageously formed as cups having a generally elliptical lip and cavity. Preferably, the cups 50 are fabricated of a relatively lightweight but rigid molded fiberglass or plastic material which may be suitably reinforced according to conventional techniques. The shape and form of the cup will be characterized herein as a hollow hemi-ellipsoid, that is, the shape that results from cutting a hollow, thin-walled ellipsoid in half with a plane through the major axis of the ellipsoid. It will be apparent that the hemi-ellipsoidal cups or blades 50 on the right-hand half of the rotor assembly 36 shown in FIG. 2 are oriented to extract the maximum force from wind travelling in an upwardly direction in relation to FIG. 2, whereas the cups 50 on the left-hand half thereof are oriented so as to present substantially streamlined surfaces to the wind and thereby exert a low counterforce tending to oppose the counterclockwise rotation of the rotor assembly as viewed in FIG. 2. In a preferred form, the cups 50 are formed with approximately a 2:1 ratio between the major axes of the elliptical shapes, i.e., cup height H twice cup width W and cup width W twice cup depth D.

Figure 9:
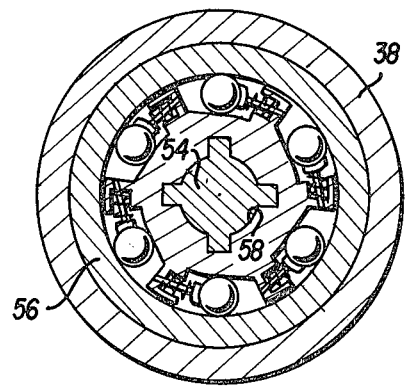

Referring now to FIGS. 7, 8 and 9, it will be seen that the rotational output of the hollow rotor shaft 38 is transmitted to a solid drive shaft 52 having upper and lower splined ends 54, 54', respectively. Drive shaft 52 is arranged coaxially within hollow shaft 38 by means of one or more, and preferably two, conventional clutches 56, such as overrunning or sprag-type clutches. The lower splined end 54' (FIG. 7) of the drive shaft of one module is drivingly interconnected to the upper splined end 54 (FIG. 8) of the drive shaft of the next subjacent module by means of intermediate connector shaft 55 which is splined at both ends. Internally splined sleeves 57 interconnect the splined ends of shaft 55 with splined ends 54, 54' of shaft 52. Sleeves 57 are locked against axial movement by one or more locking bolts 59 as shown in FIG. 8.

As shown best in FIG. 9, the outer surface of the sprag clutches 56 are peripherally engaged with the inside surface of the hollow shaft 38 so as to be non-rotatably fixed thereto. Such engagement or connection may be accomplished by any suitable and well-known means such as knurled surfaces, pins, spot welding or the like. The splined ends 54, 54' of the solid drive shaft 52 are also non-rotatably engaged in a central slotted opening 58 of each sprag clutch 56. When the hollow shaft 38 is rotated counterclockwise as shown in FIG. 9 by the force of the wind acting upon the cups 50, the sprag clutches 56 will be engaged and counterclockwise rotation will be imparted to the drive shaft 52. Conversely, when the hollow shaft 38 is rotated clockwise relative to the drive shaft 52 or when the rotation of hollow shaft 38 is stopped during counterclockwise rotation of the drive shaft 52, the latter being equivalent to rotation of the hollow shaft clockwise relative to drive shaft, the sprag clutches 56 will be free-wheeling or disengaged.

It will be appreciated that other types of clutch mechanisms may be employed to accomplish the same objective. For example, a ratchet and pawl-type clutch means could be utilized or any other clutch which functions in a similar manner.

When it is desired to perform maintenance or repair on any particular module, the clutches 56 allow the rotor assembly 36 of such module to be stopped from rotating so that maintenance personnel are enabled to gain access to the module interior without danger of injury. For stopping rotation of the rotor assembly, brake means 60 (FIGS. 3 and 7) are provided for engaging the hollow shaft 38 adjacent its lower end to thus stop the rotation thereof. Such brake means is preferably in the form of a conventional band brake arrangement as shown, but may be any other suitable braking mechanism. Brake means 60 is advantageously provided with an operating linkage 62 (FIG. 2) which extends through the lowest deck 24 of the module 14 to permit remote manual operation of the brake means from the crawl space 16 beneath the module.

Still referring to FIGS. 2 and 3, the module 14 has a cylindrically curved windshield 64 which has an angular extent about the rotor assembly 36 of approximately 195°. The windshield 64 is mounted for concentric rotation about the rotor axis on a 360° circular roller track 66.

As shown in FIG. 4, the circular roller track 66 comprises a U-shaped channel member having two upstanding legs, the radially innermost leg 69 of which has a greater vertical height. Track 66 is bolted to the reinforced concrete deck 24 by means of lag bolts 70 or the like. A plurality of rollers 72 having a V-shaped groove 74 are rotatably mounted in the channel member 68 on axles 76. The windshield 64 is provided on its lower edge with a V-shaped profile or strip 78 which rides in and is complementary to the V-shaped grooves 74 of the rollers 72. A plurality of hold-down rollers 80 are mounted adjacent the upper edge of the longer leg 69 of the channel member 68 by means of cantilevered stub axles 82. The rollers 80 are arranged to bear upon the upper flat surface 84 of the profile strip 78 to thereby maintain the windshield 64 engaged with rollers 72 in the track 66 against wind forces which may tend to dislodge it.

The internal construction of the windshield can also be seen in FIG. 4 and comprises a pair of radially spaced curved sheets or exterior skin members 86, 88 between which a corrugated stiffening member 90 is disposed. This construction results in a lightweight, yet advantageously rigid windshield structure.

Figure 10:
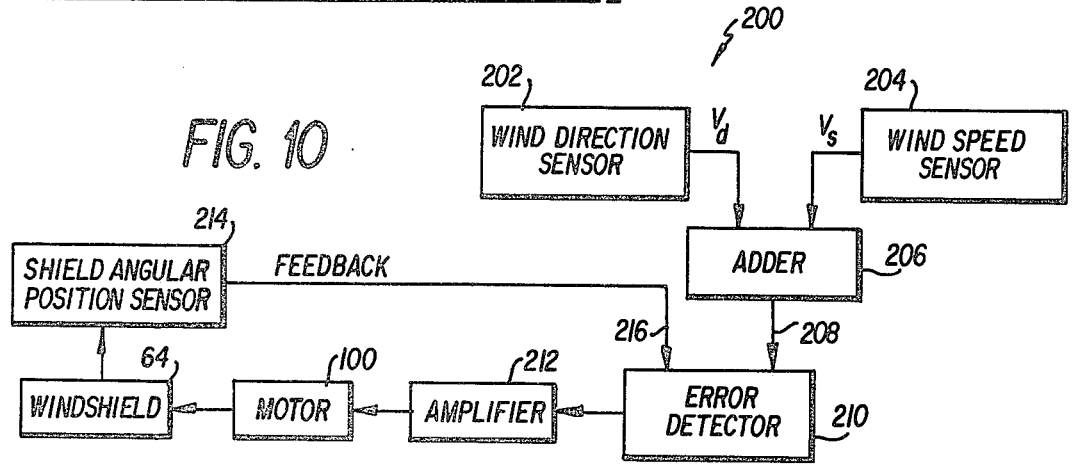
FIG. 10 is a block diagram showing the servo control system for positioning the windshield about the wind wheel rotor.

Referring now to FIGS. 2, 3, and 6, it will be seen that the windshield 64 is provided at its uppermost edge with three or more radial spokes 92 to which is rigidly secured a large diameter spur gear 94. The spokes 92 are rigidly connected to a central hub 96 rotatably mounted to the hollow shaft 38 by means of a bearing 98. A drive motor 100 is mounted on the top surface of upper deck 22 and drives a small spur gear 102 meshed with gear 94 to thus rotate the windshield 64 about circular roller track 66 to a position determined by a servo control system as shown in FIG. 10 and which is designated generally by reference numeral 200. Other types of gear arrangements may be used to rotate the windshield, such as hypoid and worm gear arrangements.

The servo control system 200 of FIG. 10 operates generally in a manner similar to a conventional remote control system for rotating an external TV antenna to a desired angular position. A wind direction sensor 202 having a DC output voltage, $V_d$, linearly proportional to the angular displacement of wind direction from an angle reference is positioned centrally on the uppermost deck 22 (FIG. 1) along with a wind speed sensor 204 having a DC output voltage, $V_s$, proportional to wind speed at wind speeds in excess of a given minimum magnitude, e.g., 30 knots.

The outputs of both sensors 202, 204 are coupled to a summing circuit 206 which transmits a signal 208 representing the sum of the DC output voltages $V_d$ and $V_s$ from sensors 202, 204 to an error detector 210. The error signal output of detector 210 is connected to a power amplifier 212 which produces a proportional voltage output which is transmitted to drive motor 100. As previously described, drive motor 100 rotates gear 102 for applying a torque to rotate the windshield 64 by means of gear 94. An angular position sensor 214, such as a linear potentiometer, detects the angular orientation of the windshield 64 and transmits a feedback signal 216 to error detector 210. When the difference between the output signal 208 from the summing circuit 206 and the feedback signal 216 is equal to zero, the error signal output from the detector 210 is zero and the drive motor 100 stops rotating the windshield 64.

It will be appreciated from the foregoing that, so long as wind velocity is lower than the given minimum magnitude, e.g., 30 knots, there is no voltage output $V_s$ from the sensor 204 and wind speed will have no effect on the position of windshield 64. Under these conditions, the windshield 64 is preferably positioned for maximum efficiency of the rotor assembly 36, that is, with the middle or midpoint M of the windshield 64 oriented approximately 90° clockwise from the wind direction shown by the arrow in FIG. 2.

The primary function of the wind speed sensor 204 is to protect the rotor assembly 36 from damage that could result from wind speeds in excess of the wind speed for which the wind wheel rotor assembly and associated components were designed. Thus, as wind speed increases above the given minimum magnitude of 30 knots, the DC output voltage signal $V_s$ increases from zero in proportion to wind speed and is summed with the voltage output $V_d$ of sensor 202 to reduce the angle between the midpoint M of the windshield 64 and the wind direction, i.e., to position the windshield in a more counterclockwise position than that shown in FIG. 2. At a predetermined maximum wind speed such as, for example, 80 knots, the output $V_s$ of wind speed sensor 204 is proportional to approximately 90° so that the midpoint M of the windshield 64 is oriented directly into the wind to thereby prevent impingement of the high speed and possibly damaging winds on the rotor assembly 36.

The present invention also contemplates that, if the windmill installation is of substantial height, each module or group of modules could be provided with a separate and independent windshield position control system as shown in FIG. 10 because of the well-known phenomenon of variation of mean wind velocity with altitude. In such case, it would be possible, for example, to measure wind velocity and direction by means of pressure sensors mounted orthogonally about the upper or lower decks of the modules.

From the foregoing description, it will be apparent that the windmill apparatus of the present invention provides a particularly simple and efficient means for extracting energy from natural wind currents. Although only a preferred embodiment of the invention is specifically illustrated and described herein, it will be appreciated that many modifications and variations of the present invention are possible in light of the above teachings and within the purview of the appended claims without departing from the spirit and intended scope of the invention.

What is claimed is:

1. A windmill installation comprising:
   a base;
   a plurality of wind wheel modules mounted on said base in vertically stacked relation, each module having a wind rotor comprising a hollow shaft and at least one rotor blade affixed to said hollow shaft for producing rotation of said wind rotor;
   a drive shaft for delivering the rotational output of all the wind rotors to a utilization device; said drive shaft extending substantially coaxially through said hollow shaft;
   clutch means arranged within the hollow shaft of each rotor for interconnecting such hollow shaft to the drive shaft such that in one direction of rotor rotation the rotor is positively engaged with the drive shaft and in the other direction of rotor rotation the rotor is disengaged from the drive shaft; and
   brake means associated with the rotor of each module and engageable with the hollow shaft thereof for stopping the rotation of the rotor of such module independently of the rotors of the other modules, whereby the rotor of one module is adapted to be stopped from rotation without stopping the rotation of the rotors of the other modules.

2. The windmill installation according to claim 1, including means remote from each module for operating the brake means associated with such module.

3. The windmill installation according to claim 1, wherein each module comprises an upper and lower planar deck interconnected by a plurality of columns, bearings centrally mounted in each deck, said rotor being rotatably mounted in said bearings.

4. The windmill installation according to claim 1, wherein said clutch means comprises at least two overrunning-type clutches arranged in axially spaced relation between said drive shaft and said hollow shaft, said clutches supporting said hollow shaft coaxially on said drive shaft.

5. The windmill installation according to claim 1, including hub means fixed to said hollow shaft and mounting a plurality of radial, spoke-like arms, rotor blades mounted to the radially outermost ends of the arms.

6. The windmill installation according to claim 5, wherein said rotor includes a plurality of rotor blades, said blades comprising cup members, each cup member having a wind collecting cavity on one side thereof and a streamlined curved shape on the other side thereof.

7. The windmill installation according to claim 6, wherein said cup members comprise hollow hemi-ellipsoids fabricated of a reinforced plastic resin material.

8. The windmill installation according to claim 1, wherein said modules are spaced apart to provide a crawl space between adjacent modules, said remote operating means including a mechanical linkage extending into said crawl space and adapted to be operated therefrom.

9. The windmill installation according to claim 4, wherein said clutches comprise sprag-type clutches with rollers which provide an anti-friction bearing when the rotor rotates in the disengaging direction relative to the drive shaft.

10. The windmill installation according to claim 4, wherein said clutches are connected to the drive shaft by a splined connection.

11. The windmill installation according to claim 1, including:
an arcuate windshield arranged about the rotor of each wind wheel module;
sensor means associated with said installation and responsive to the wind for generating electrical signals corresponding only to wind direction when the wind velocity is less than a predetermined minimum velocity above zero and to both the speed and direction of the wind when the wind velocity is above said predetermined minimum velocity; and
means connected to said sensor means for receiving said electrical wind speed and direction signals and for automatically positioning said windshield in a selected angular position relative to the direction of the wind, said automatic positioning means including means for generating an electrical output signal proportional to the sum of said electrical signals corresponding to wind speed and direction and for transmitting said output signal to an error detector, means for detecting the angular orientation of said windshield and transmitting an electrical feedback signal proportional to said angular orientation to said error detector and means connected to the output of said error detector for rotating said windshield through an angular arc proportional to the difference between said output signal and said feedback signal.

12. The windmill installation according to claim 11, including means for rotatably mounting said windshield about said rotor comprising a circular track arranged about the rotor, said track having a plurality of V-shaped rollers mounted thereon, said windshield having a V-shaped lower edge profile complementary to and bearing upon said V-shaped rollers and a plurality of hold-down roller means mounted on said track for engaging said windshield and preventing dislodgement thereof from said track.

13. The windmill installation according to claim 11, wherein said windshield comprises an arcuate horizontally corrugated member interposed between a pair of exterior sheets or skin members.

14. The windmill installation according to claim 11, wherein said automatic positioning means includes a windshield drive motor mounted to said module, said drive motor having a gear enmeshed with a gear fixed to said windshield.

* * * * *